Sept. 20, 1971 S. ZELNICK ET AL 3,605,283
SHRINK TUNNEL
Filed April 10, 1969 3 Sheets-Sheet 1

INVENTORS
SEYMOUR ZELNICK
KELVIN G. ANDERSON

BY

ATTORNEY

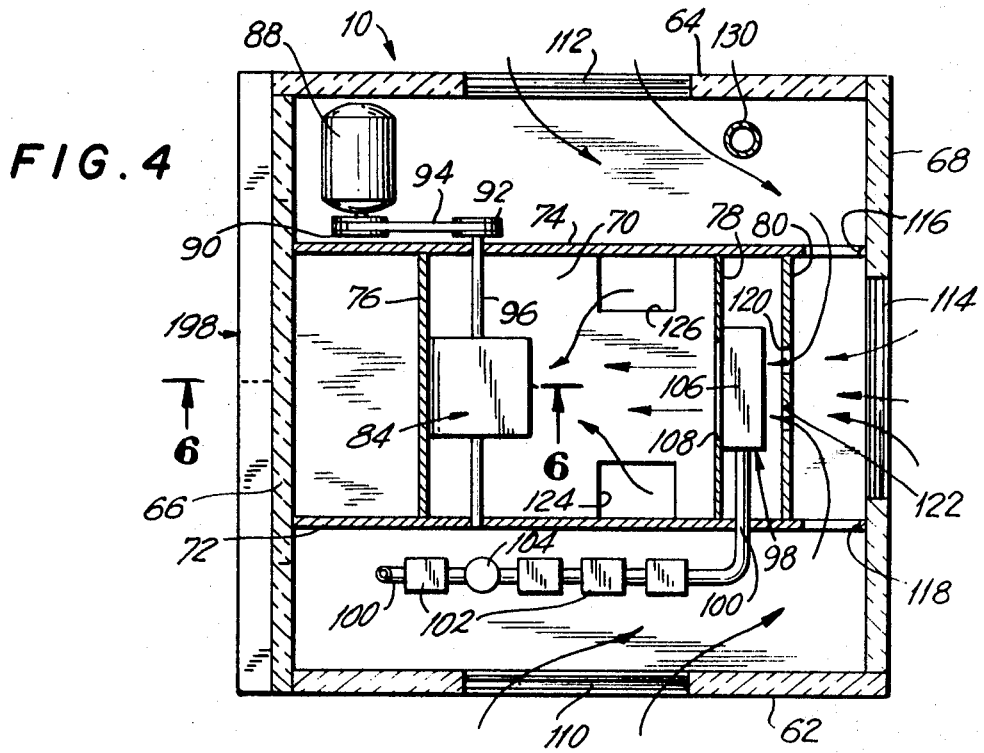
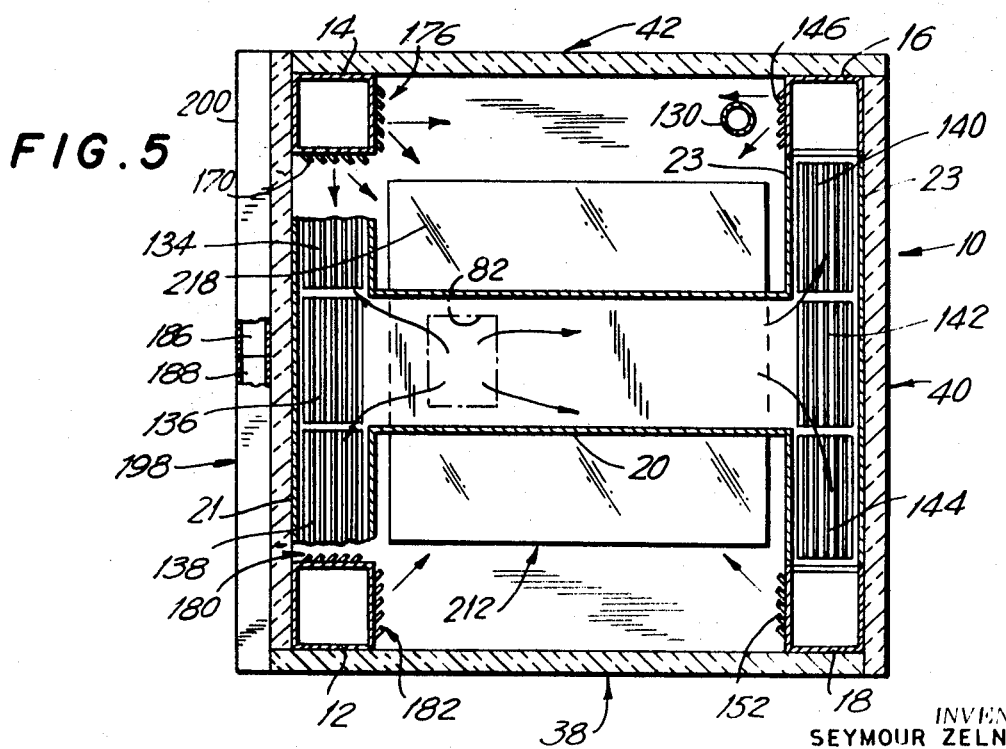

United States Patent Office 3,605,283
Patented Sept. 20, 1971

3,605,283
SHRINK TUNNEL
Seymour Zelnick, Orange, N.J., and Kelvin G. Anderson, Bronx, N.Y., assignors to Weldotron Corporation, Newark, N.J.
Filed Apr. 10, 1969, Ser. No. 814,934
Int. Cl. B65b 53/00
U.S. Cl. 34—224                                18 Claims

ABSTRACT OF THE DISCLOSURE

New and improved shrink tunnel comprising hot gas generating means for the shrink wrapping of thermoplastic load wrap materials is provided, and includes shrink tunnel support means which function to both support the said shrink tunnel and provide means for directing said hot gases generally tangentially of said thermoplastic load wrap materials to shrink-wrap the same.

BACKGROUND OF THE INVENTION

This invention relates to a new and improved shrink tunnel and, more particularly, to a shrink tunnel which is particularly adapted to the shrink wrapping of thermoplastic film-wrapped palletized loads.

Briefly described, it may be understood that such film-wrapped palletized loads, or "Pallet-Paks" as they are referred to by applicants' assignee, the Weldotron Corporation of Newark, N.J., comprise a pallet upon which is stacked a load of materials and around all of the exposed surfaces of which are bagged or wrapped a sheet or sheets of a suitably thermoplastic film material in the nature, for example, of polyethylene. In the preparation of such palletized loads for shipment, heat is applied to the said thermoplastic film materials to shrink the same into tight contact with the respective load surfaces and provide a reasonably well protected and stable palletized load to obvious advantage, and it may be readily understood that the fastest method of accomplishing such film material heat-shrinking for high volume palletized load shrink-wrapping operations is the shrink tunnel. A more detailed explanation of this palletized load or "Pallet-Pak" concept, and of the many significant advantages thereof, is provided in the Bulletin MH 4500 PA–1 of applicants' assignee, the Weldotron Corporation, entitled "Weldotron Pallet-Pak, a Revolutionary Materials Handling Concept," and such Bulletin is hereby incorporated by reference herein.

Although there are wide a variety of shrink tunnels currently available for this palletized load shrink-wrapping operation, it may be understood that there are certain disadvantages inherent in the design and manner of operation thereof.

More specifically, in the prior art shrink tunnels it may be understood that the hot gases are directed into ducts located in the tunnel walls which are in turn disposed parallel to the direction of palletized load travel through the tunnel. A disadvantage of this configuration resides in the fact that the said ducts, which are disposed in close proximity to the side faces of the palletized load, function to discharge the hot gases directly at the palletized load with the result that the said side faces of the latter are heated to a higher degree than the other load faces to give rise to lack of shrink-wrapping uniformity.

In addition, the prior art shrink tunnels will generally be found to comprise an independent support frame or structure, in the nature of structural steel angles or channels, to which the hot gas duct means and tunnel walls are attached to somewhat unduly complicate the design and construction thereof with attendant increase in tunnel fabrication costs.

OBJECTS OF THE INVENTION

It is, accordingly, an object of this invention to provide a new and improved shrink tunnel which provides for substantial uniformity of load wrap heating during the shrink-wrapping operation.

Another object of this invention is the provision of a shrink tunnel as above comprising hollow support columns and a hollow cross member which function to form the main structural support for the tunnel as well as the requisite tunnel hot gas ducts.

A further object of this invention is the provision of a shrink tunnel as above which requires the use of only readily available components of proven dependability in the construction thereof to insure long periods of satisfactory, maintenance free tunnel operation.

A still further object of the invention is the provision of a shrink tunnel as above which is particularly adaptable for use in the shrink wrapping of palletized loads or "Pallet-Paks."

SUMMARY OF THE INVENTION

As currently preferred, the new and improved shrink tunnel of the invention is particularly adapted for the shrink-wrapping of thermoplastic load-wrap materials or palletized loads, and comprises a plurality of hollow support columns which form the main tunnel structural support, and a combustion chamber assembly disposed atop said columns. Hot gas directing means including duct means are provided in said support columns, and a hollow cross member is provided to connect said combustion chamber assembly to said support columns for the flow of hot gases therebetween. Further included in said hot gas directing means are pluralities of readily adjustable louver assemblies which are disposed in openings provided therefor in said hollow support columns and said cross member, respectively, and are effective to direct said hot gases generally tangentially of said thermoplastic load-wrap materials into contact therewith to shrink-wrap the latter. In a first form of the shrink tunnel, the palletized load entry and exit means are provided at the same side of the tunnel while, in a second form of the tunnel, the said palletized load entry and exit means are provided at opposite sides thereof.

DESCRIPTION OF THE DRAWINGS

The above and other objects and advantages of the invention are believed made clear by the following detailed description thereof taken in conjunction with the accompanying drawings wherein:

FIG. 4 is a horizontal cross-sectional view taken along line 4—4 in FIG. 1;

FIG. 5 is a horizontal cross-sectional view taken along line 5—5 in FIG. 1;

DETAILED DESCRIPTION OF THE INVENTION

Figure 1:
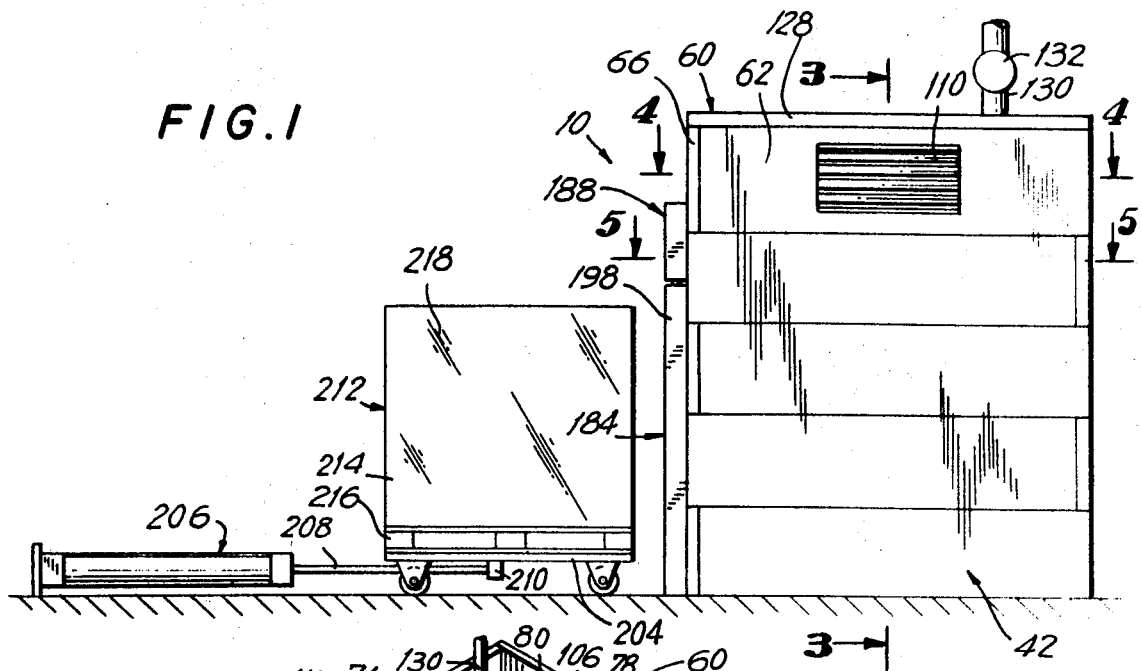
FIG. 1 is a side elevational view of a first form of a new and improved shrink tunnel constructed and operative in accordance with the teachings of this invention.
Figure 2:
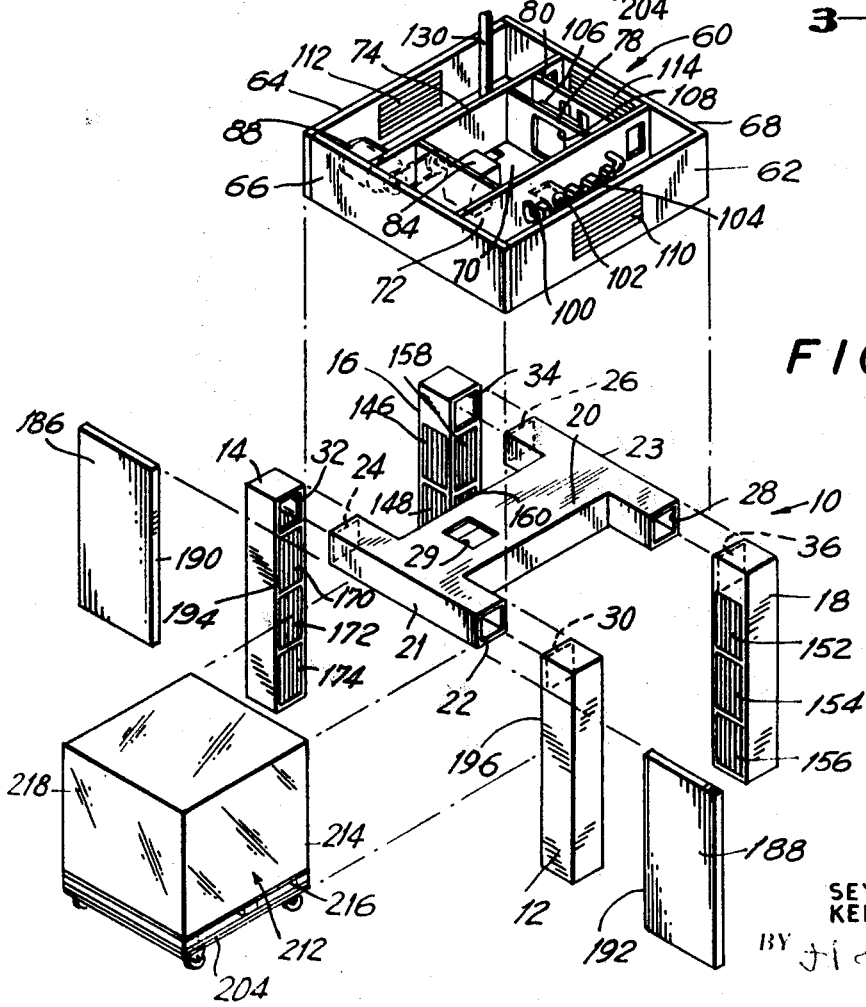
FIG. 2 is an exploded perspective view of the shrink tunnel of FIG. 1.
Figure 3:
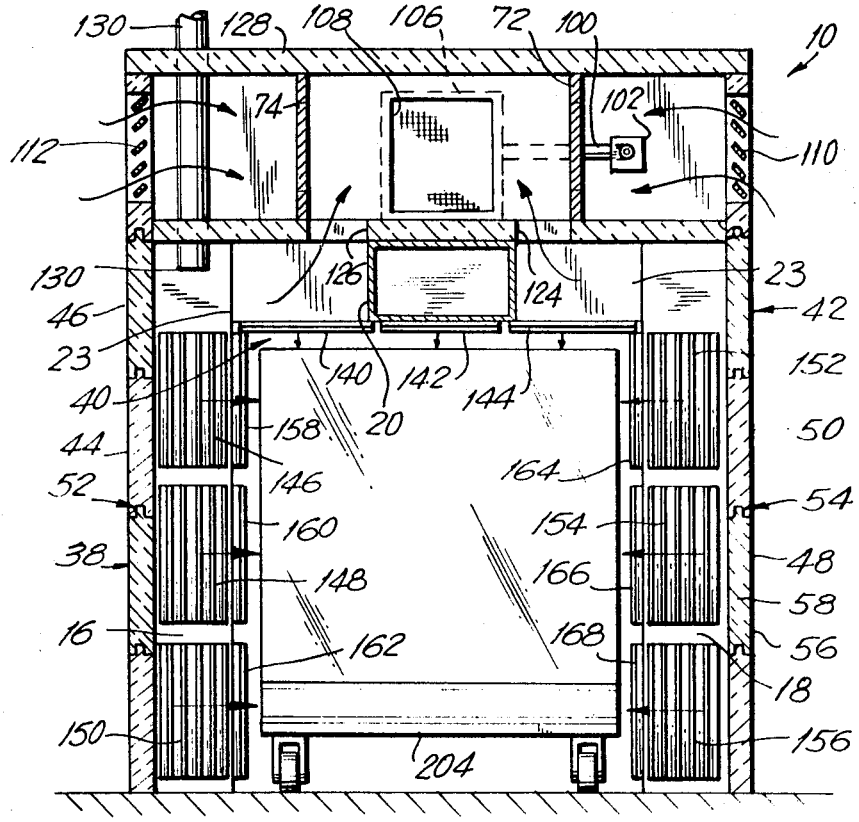
FIG. 3 is a vertical cross-sectional view taken along line 3—3 in FIG. 1.

Referring now to the drawings, and initially to FIGS. 1 through 3 inclusive, a first form of a new and improved shrink tunnel constructed and operative in accordance with the teachings of this invention is indicated generally at 10 and may be seen to comprise four hollow columns 12, 14, 16 and 18 which are respectively disposed at the four corners of the shrink tunnel 10 as best seen in FIG. 2, and which may accordingly be understood to form the main structural support members for the latter on a floor or horizontal support as indicated in FIG. 1.

A generally I-shaped, hollow cross member is indicated at 20 and functions to provide hot gas duct means for the flow of hot gases to the respective hollow columns 12, 14, 16 and 18. More specifically, the cross member 20 comprises cross pieces 21 and 23 which respectively include hot gas outlet openings 22 and 24, and 26 and 28, which mate as indicated with hot gas inlet openings 30, 32, 34 and 36 provided as shown in the respective hollow columns 12, 14, 16 and 18 adjacent the upper extremities thereof. In addition, a hot gas inlet opening 29 is formed as shown in the upper wall of the hollow cross member 20.

Side walls as indicated generally at 38 and 42, and a rear wall as indicated generally at 40, are provided to respectively extend as best seen in FIG. 5 between hollow columns 12 and 18, 14 and 16, and 16 and 18, respectively, to form three sides of the tunnel 10. Each of the said walls is of substantially the same construction and, as best seen in FIG. 3 for side walls 38 and 42, may be understood to be formed from stacked wall panels as indicated at 44 and 46 for side wall 38, and 48 and 50 for side wall 42, respectively, which wall panels are joined together in substantially fluid-tight manner through the use of tongue and groove joint means as indicated generally at 52 and 54, respectively.

The said wall panels may be understood to be maintained in the depicted positions thereof through attachment to the respective hollow columns 12, 14, 16 and 18 in any convenient, and preferably readily removable manner. Each of the said wall panels, as for example wall panel 48 of side wall 42, is of substantially the same construction in comprising a suitably shaped hollow wall panel frame member 56 which is filled with any suitable heat insulating material 58.

A combustion chamber assembly is indicated generally at 60 and may be understood to be disposed as best seen in FIG. 2 atop the respective upper extremities of the hollow columns 12, 14, 16 and 18 for support therefrom. The combustion chamber assembly 60 comprises side walls 62 and 64, a front wall 66, a back wall 68, a bottom wall 70, and is internally divided as shown into a plurality of chambers by internal walls 72, 74, 76, 78 and 80, respectively; and it may be understood that each said combustion chamber wall is preferably of the same heat insulating construction as described in detail hereinabove for wall panel 48 of tunnel side wall 42.

Figure 6:
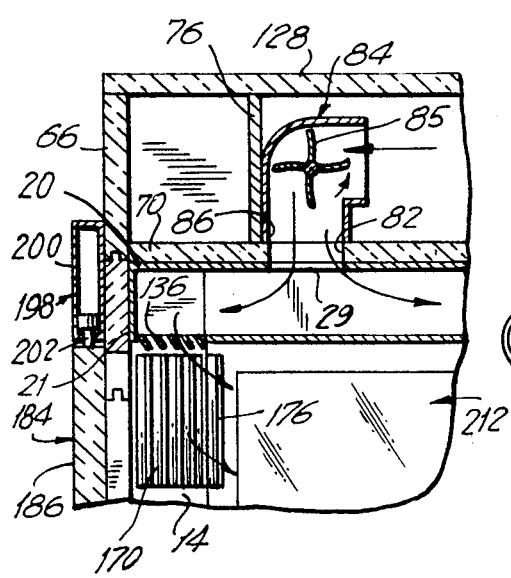
FIG. 6 is a vertical cross-sectional view taken along line 6—6 in FIG. 4.

A hot gas outlet opining 82 is formed in the combustion chamber assembly bottom wall 70 to mate with the hot gas inlet opening 29 in the cross piece 20 in the manner clearly illustrated in FIG. 6.

A fan assembly is indicated generally at 84 in FIG. 6 and comprises a fan 85. The fan assembly is supported from the respective combustion chamber assembly internal and bottom walls 76 and 70 in such manner that the fan outlet 86 mates with the hot gas outlet opening 82 whereby may be understood that operation of the fan 84 will be effective to flow hot gases into the cross member 20. The fan assembly 84 is operated from a fan drive motor 88 (FIG. 4) which is supported as shown from the combustion chamber assembly bottom wall 70 and is effective to drive the fan assembly 84 in obvious manner through the medium of pulleys 90 and 92, drive belt 94, and fan assembly drive shaft 96, respectively, operatively connected therebetween as illustrated.

A gas burner assembly is indicated generally at 98 and, as best seen in FIG. 4, comprises a gas supply conduit 100 to which is connected a non-illustrated source of a suitable, readily combustible gas in the nature, for example, of propane. Suitable gas burner assembly control means in the nature, for example, of valve and pressure regulator means, are indicated at 102 and 104 and may be understood to be operatively connected in the gas supply conduit 100. A gas burner is indicated at 106 and is supported as indicated from the internal wall 78 of the combustion chamber assembly 60 at the terminus of the gas supply conduit 100. An opening 108 (FIGS. 2, 3 and 4) is formed as shown in the internal wall 78 in hot gas flow communication with the downstream side of the gas burner 106.

Readily adjustable louver assemblies 110, 112 and 114 are respectively disposed as shown in air inlet openings provided therefor in the respective side and rear walls 62, 64 and 68 of the combustion chamber assembly 60. In addition, air inlet openings 116 and 118 are respectively formed as shown in the combustion chamber internal walls 72 and 74, while spaced air inlet and directing openings 120 and 122 are respectively formed in the combustion chamber assembly internal wall 80 to properly direct air to the upstream side of the gas burner 106 in a manner described in greater detail hereinbelow.

Hot gas recirculation openings are indicated at 124 and 126 and are formed as best seen in FIG. 4 in the depicted spaced manner in the bottom wall 70 of the combustion chamber assembly 60. The combustion chamber assembly 60 is completed by the provision of a top wall 128 therefor as best seen in FIG. 3, and it may be understood that said top wall, or not insubstantial sections thereof, are preferably made readily removable to enable convenient, periodic access to the interior of the combustion chamber assembly for the performance of obvious component adjustment and/or maintenance functions.

A vent pipe 130 is provided to extend as best seen in FIG. 3 from the interior of the shrink tunnel 10 through the combustion chamber 60 to without the latter, and it may be understood that continuously operable blower means as indicated at 132 in FIG. 1 would be operatively connected in said vent pipe to enable purging of the shrink tunnel 10 prior to the commencement of the operation thereof and to function in the nature of pressure relief means to prevent excessive pressure build-up in the shrink tunnel during such operation, all as discussed in greater detail hereinbelow.

Referring again to FIGS. 3 and 5, it may be seen that readily adjustable louver assemblies 134, 136 and 138, respectively, are disposed in hot gas exhaust openings provided therefor in the bottom wall of the cross piece 21 of the cross member 20, while readily adjustable louver assemblies 140, 142 and 144 are similarly disposed in hot gas exhaust openings provided therefor in the bottom wall of cross piece 23 of the said cross member.

Readily adjustable louver assemblies are also disposed in hot gas exhaust openings provided therefor in the respective internal faces or sides of the hollow support columns 12, 14, 16 and 18. More specifically, and in the manner best seen in FIG. 3, readily adjustable louver assemblies 146, 148 and 150 are disposed in hot gas exhaust openings provided therefor in the front face of hollow support column 16, while readily adjustable louver assemblies 152, 154 and 156 are disposed in hot gas exhaust openings provided therefor in the front face of hollow support column 18.

In like manner, readily adjustable louver assemblies 158, 160 and 162 are disposed in hot gas exhaust openings provided therefor in the side face of hollow support column 16, while readily adjustable louver assemblies 164, 166 and 168 are disposed in hot gas exhaust openings provided therefor in hollow support column 18.

As seen in FIG. 2, readily adjustable louver assemblies 170, 172 and 174 are disposed in hot gas exhaust openings provided therefor in the side face of hollow support column 14, while three readily adjustable louver assemblies as generally indicated at 176 in FIG. 5 may be understood to be similarly disposed in hot gas exhaust openings provided therefor in the rear face of the said hollow support column.

In addition, it may be understood that three readily adjustable louver assemblies, as indicated generally at 180 in FIG. 5, are disposed in hot gas exhaust openings provided therefor in the side face of hollow support column 12, while three readily adjustable louver assemblies, as indicated generally at 182 in FIG. 5, are provided in the rear face of the said hollow support column.

A shrink tunnel door assembly is indicated generally at 184 (FIG. 1) and may be understood to comprise tunnel doors 186 and 188 which are slidable from a first or closed position thereof as indicated in FIG. 5, to a second or open position in which the respective inner door edges 190 and 192 (FIG. 2) are in substantial alignment with the respective inner edges 194 and 196 of the hollow support columns 12 and 14 to thereby open the shrink tunnel 10 to the maximum possible extent. To this effect, automatically operable door moving and guiding means, as indicated at 198, are provided and may be understood to take any form suitable to the operation of the doors 186 and 188 to move the same between the said first and second positions thereof. More specifically, and as best seen in FIG. 6, the door moving and guiding means 198 may generally comprise a track-forming member 200 into which project door guide and support means 202 so that the doors 186 and 188 are hung therefrom for guided movement relative thereto through the use of non-illustrated door operating means. Such door moving and guiding means may, for example, take the form of those manufactured and marketed by the Richards-Wilcox Company of Aurora, Ill. under the designation "Model A, Electric Operator 400."

A dolly is indicated at 204 in FIG. 1, and dolly moving means which may, for example, take the form of a conventional hydraulic or pneumatic slave cylinder are indicated at 206 and are operatively connected to the dolly 204 through the connection of the cylinder rod 208 to the said dolly as indicated at 210.

A palletized load or "Pallet-Pak" 212, comprising a load of materials 214 stacked upon a pallet 216 and contained and/or wrapped in a sheet or sheets of a suitable thermoplastic film material 218, all as described hereinabove, is disposed as shown upon the dolly 204 so as to be movable therewith. With such arrangement it is believed clear that the dolly 204, and the palletized load or "Pallet-Pak" 212 may be movable, through the operation of suitable, non-illustrated control means which control the actuation of the slave cylinder 206, between a first position thereof as depicted in FIG. 1 wherein the said dolly and and palletized load are disposed without the shrink tunnel, and a second position thereof as depicted in FIGS. 2, 3 and 5 wherein the same are disposed within the said shrink tunnel.

Figure 7:
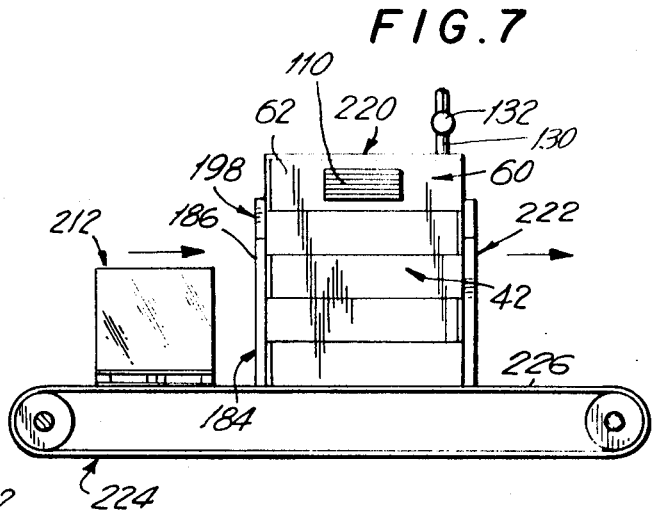
FIG. 7 is a side elevational view of a second form of a new and improved shrink tunnel constructed and operative in accordance with the teachings of this invention.

Referring now to the form of the shrink tunnel of the invention as indicated generally at 220 in FIG. 7, it may be understood that the same is of substantially the same construction as the shrink tunnel 10 of FIGS. 1 through 6, whereby like reference numerals are utilized to identify like tunnel components of the shrink tunnel 220.

More specifically, it may be understood that in place of a rear tunnel wall, the shrink tunnel 220 of FIG. 7 comprises an additional or rear tunnel door assembly as indicated generally at 222, and it may be understood that the door assembly 222 is of substantially the same construction and manner of operation as described in detail hereinabove with regard to door assembly 184.

The shrink tunnel 220 is, of course, particularly adaptable for use with palletized load or "Pallet-Pak" transport means which are effective to move the former completely through the shrink tunnel. As an example of such transport means, conveyor means are indicated generally at 224 in FIG. 7 and may be seen to comprise suitably driven, endless conveyor belt means 226 which are effective to transport the palletized load, as again indicated generally at 212, through the shrink tunnel 220 with the former entering through door assembly 184 upon the opening thereof and exiting through the door assembly 222 upon the opening of the latter.

OPERATION

In the operation of the shrink tunnel 10 for the shrink-wrapping of a palletized load or "Pallet-Pak" 212, it may be understood that the former would initially be prepared for the same through suitable adjustment, if required by the size and/or configuration of the palletized load 212, of the respective, readily adjustable louver assemblies 134, 136, 138, 140, 142, 144, 146, 148, 150, 152, 154, 156, 158, 160, 162, 164, 166, 168, 170, 172, 174, 176, 180 and 182 to, in each instance, direct the hot gases emanating therefrom in generally tangential manner relative to he relevent top or side surface of the said palleltized load. This is to say that the said louver assemblies are adjusted so that the hot gases emanating therefrom do not, in any event, impinge directly upon the said palletized load surfaces and are effective to heat the latter in substantially uniform manner. In addition, the respective, readily adjustable louver assemblies 110, 112 and 114 are adjusted, if required, to provide for the desired flow of air into the combustion chamber assembly 60.

Following this, the blower 132 (FIG. 1) would be operated to withdraw air from the shring tunnel 10 through conduit 130 for a period of time sufficient to insure suitable purging thereof, whereupon operation of the fan drive motor 88 and the flow of the combustible gas through conduit 100 to the gas burner 106, with comcomitant ignition of the latter, would be effected, to commence hot gas generation; and it may be understood that this would be continued for a period of time sufficient to insure that the shrink tunnel 10 had assumed steady state operational conditions with regard to the internal temperature thereof.

Once this steady state of operational condition has been reached, the shrink-wrapping operation would be commenced as, for example, through the pressing of the start button of the non-illustrated shrink-tunnel control means, to initiate the automatic, shrink-wrapping cycle by the opening of the door assembly 184 through actuation of the door opening means 198.

Following this, the dolly moving which, in this instance, take the form of slave cylinder 206, would be actuated to move the dolly 204, and the palletized load or "Pallet-Pak" 212 stacked thereon, into the shrink tunnel 10 from the position of the former depicted in FIG. 1 to the position thereof depicted in FIGS. 3 and 4, whereupon the said door assembly would be automatically closed to commence the shrink-wrapping of the thermoplastic film material 218 to the load of materials 214 by the suitable direction of the tunnel-generated hot gases thereover.

More specifically, it may be understood that operation of the fan assembly 84 will be effective to draw ambient air through the combustion chamber louver assemblies 110 and 112 and openings 116 and 118, and through combustion chamber louver assembly 114, for combined flow through openings 120 and 122 over the gas burner 106 with resultant gas combustion and generation of hot gases and, from the said gas burner, to the said fan assembly. Therefrom, the fan 85 will be effective to force these products of combustion, or hot gases, through mated openings 82 and 29 (FIG. 6) into the cross member 20, with portions of the hot gases flowing from the respective, adjustable louver assemblies 134, 136, 138, 140, 142 and 144 of the cross member 20 in generally tangential manner relative to the top surface of the palletized load 212 to contact and suitably and uniformly heat-shrink the portion of the thermoplastic film material 218 disposed thereover.

Concomitantly other portions of these hot gases will flow from the cross member 20 into the respective hollow support columns 12, 14, 16 and 18 through mated openings 22 and 30, 24 and 32, 26 and 34, and 28 and 36, respectively, for generally downward flow in the said hollow support columns and flow therefrom through the respective support column louver assemblies, 146, 148, 150, 152, 154, 156, 158, 160, 162, 164, 166, 168, 170, 172, 174, 176, 180 and 182, in the direction of the length of the tunnel generally tangential manner in each instance relative to the relevant side and front and rear surface of the palletized load 212 to contact and suitably and uniformly heat-shrink the thermoplastic film material portions disposed thereover.

In addition, it may be understood that the hot gases discharged as described from the respective louver assemblies of the said cross member support columns will, after effective passage over the relevant palletized load surfaces, be drawn through recirculation openings 124 and 126 in the bottom wall 70 of the combustion chamber assembly 60 for mixture within the latter with the hot gases from the gas burner 106 and recirculatory flow therewith through the shrink tunnel 10 as should be obvious.

By virtue of the proper sizing and continuous operation of blower means 132 in conduit 130, the adjustability of the respective combustion chamber louver assemblies 110, 112 and 114, to regulate the flow of ambient air therethrough, and the provision of control means in the nature of valve means 110 in the gas supply conduit 100 to control the amount of combustible gas supplied per unit time for combustion to the gas burner 106, it may be understood that a desired hot gas exhaust temperature from the respective cross member and hollow support column louver assemblies in the nature, for example, of 400° F. may readily be provided.

After the dolly 204 and palletized load 212 have remained in the shrink tunnel 10 for a period of time predetermined to be sufficient to effect the suitable shrink-wrapping of the thermoplastic film material 218 to the load of materials 214, the door operating means 198 will be automatically actuated to move the doors 186 and 188 to the respective open positions thereof, whereupon the dolly moving means 206 will be operated to retract the dolly 204 from the shrink tunnel to complete the shrink-wrapping cycle.

Following this, it may be understood that suitable palletized load handling means in the nature, for example, of a fork lift truck, may be employed to remove the palletized load 212 from the dolly 204, and replace it with another of the same for suitable shrink-wrapping through re-cycling of the shrink tunnel as described.

Referring now to the shrink-tunnel 220 of FIG. 7, it may be understood that the same is operable in substanially the same manner as the shrink tunnel 10 in the performance of the shrink-wrapping operation. More specifically, in the operation of the shrink tunnel 220 it is believed clear that the cycle would commence with the opening of the front door assembly 184 and the movement of the palletized load 212 thereinto through suitable operation of the conveyor belt means 226. Following this, the front door assembly 184 would, of course, be re-closed and the said conveyor belt means stopped for a period of time predetermined to be sufficient to effect the shrink-wrapping function, whereupon the rear door assembly 222 would be opened and the conveyor belt means 226 operated to remove the now suitably shrink-wrapped palletized load 212 from the tunnel.

Concomitantly with the opening of the rear door assembly 222 and operation of conveyor belt means 226, it is believed clear that the front door assembly 184 could, if desired, be re-opened to provide for the simultaneous entry of a following palletized load into the shrink tunnel 222 through such operation of the said conveyor belt means.

While there have been shown and described preferred embodiments of the invention, it will be understood that the invention may be embodied otherwise than as herein specifically illustrated or described, and that in the illustrated embodiments certain changes in the details of construction and in the form and arrangement of the parts may be made without departing from the underlying ideal and principles of this invention within the scope of the appended claims.

What is claimed is:

1. In a shrink tunnel which is adapted to be positioned on a horizontal support and which includes shrink tunnel support means, and hot gas generation means for heat-shrinking thermoplastic wrap material on a load in said tunnel through the application of hot gases to said materials; the improvements comprising passage means formed in said support means and having outlets for the passage of said hot gases from said hot gas generation means to the interior of said shrink tunnel for application to said thermoplastic wrap material, said support means comprising a plurality of vertical columns having said passage means therein, and hot gas directing means for directing said hot gases from said passage means generally tangentially of said thermoplastic wrap material for application to the latter in the direction of the length of the tunnel.

2. In a shrink tunnel as in claim 1 wherein, said hot gas directing means are disposed at the respective outlets of said passage means.

3. In a shrink tunnel as in claim 2 wherein, said hot gas directing means comprise louver assemblies disposed at said passage means outlets.

4. In a shrink tunnel as in claim 1 further comprising, means disposed intermediate said hot gas generation means and said support means, respectively, and forming additional hot gas passage means for the passage of said hot gases from said hot gas generation means to said support means.

5. In a shrink tunnel as in claim 4 wherein, said intermediately disposed means comprise outlets for said additional hot gas passage means to enable the passage of portions of said hot gases therefrom to the interior of said shrink tunnel for application to said thermoplastic wrap materials.

6. In a shrink tunnel as in claim 5 further comprising, means for recirculating said hot gases from the interior of said shrink tunnel through said hot gas generation means for re-application to said thermoplastic wrap materials.

7. In a shrink tunnel as in claim 5 further comprising hot gas directing means for directing said hot gases from said additional hot gas passage means outlets generally tangentially of said thermoplastic wrap materials for application to the latter in the direction of the length of the tunnel.

8. In a shrink tunnel as in claim 7 wherein, said hot gas directing means are provided in said support means and in said intermediately disposed means, respectively, and comprise louver assemblies disposed at the respective passage means outlets thereof.

9. In a shrink tunnel as in claim 7 further comprising, means for recirculating said hot gases from the interior of said shrink tunnel through said hot gas generation means for re-application to said thermoplastic wrap materials.

10. In a shrink tunnel as in claim 7 for use in the shrink wrapping of loads having the respective side and top surfaces thereof wrapped in said thermoplastic wrap materials wherein, said support means extend in spaced, generally vertical manner, said intermediately disposed means extend in generally horizontal manner above said support means, said hot gas directing means of the former are effective to direct said hot gases generally tangentially of said side surfaces, and said hot gas directing means of the latter are effective to direct said hot gases generally tangentially of said top surfaces.

11. In a shrink tunnel as in claim 8 further comprising, shrink tunnel entry and exit means formed at the same side of said shrink tunnel.

12. In a shrink tunnel as in claim 8 further comprising, shrink tunnel entry and exit means formed respectively at opposite sides of said shrink tunnel.

13. In a shrink tunnel as in claim 1 further comprising, means for recirculating said hot gases from the interior of said shrink tunnel through said hot gas generation means for re-application to said thermoplastic wrap materials.

14. In a shrink tunnel as in claim 1 further comprising, shrink tunnel entry and exit means formed at the same side of said shrink tunnel.

15. In a shrink tunnel as in claim 1 further comprising, shrink tunnel entry and exit means formed respectively at opposite sides of said shrink tunnel.

16. In a shrink tunnel which is adapted to be positioned on a horizontal support and which includes shrink tunnel support means, and hot gas generation means for heat-shrinking thermoplastic wrap material on a load in said tunnel through the application of hot gases to said material; the improvements comprising, passage means formed in said support means and having outlets for the passage of said hot gases from said hot gas generation means to the interior of said shrink tunnel for application to said thermoplastic wrap material, said support means comprising a plurality of vertical columns having said passage means therein, the hot gas generating means being disposed above the lower ends of said columns, said columns being provided with hot gas outlets below the upper ends of said columns.

17. In a shrink tunnel which is adapted to be positioned on a horizontal support and which includes shrink tunnel support means, and hot gas generation means for heat-shrinking thermoplastic wrap material on a load in said tunnel through the application of hot gases to said material; the improvements comprising, passage means formed in said support means and having outlets for the passage of said hot gases from said hot gas generation means to the interior of said shrink tunnel for application to said thermoplastic wrap material, said support means comprising a plurality of vertical columns having said passage means therein, the hot gas generating means being disposed above the lower ends of said columns, said columns being provided with hot gas outlets vertically spaced from each other along the lengths of the respective columns.

18. A shrink tunnel as in claim 17, and means in at least some of said outlets for directing the hot gases generally tangentially of said thermoplastic wrap material in the direction of the length of the tunnel.

References Cited

UNITED STATES PATENTS

| | | | |
|---|---|---|---|
| 555,856 | 3/1896 | Forter | 263—28 |
| 1,414,973 | 5/1922 | Allsop et al. | 34—222X |
| 3,309,835 | 3/1967 | Peppler | 34—225UX |
| 3,312,811 | 4/1967 | Shanklin | 34—225UX |
| 3,349,502 | 10/1967 | Kieffer | 34—216 |

FREDERICK L. MATTESON, JR., Primary Examiner

H. B. RAMEY, Assistant Examiner

U.S. Cl. X.R.

34—236; 53—184